No. 663,921. Patented Dec. 18, 1900.
G. R. McMULLEN.
BAKE PAN.
(Application filed Mar. 6, 1900.)

(No Model.) 2 Sheets—Sheet 1.

Witnesses

George R. McMullen, Inventor.

By his Attorneys,

No. 663,921. Patented Dec. 18, 1900.
G. R. McMULLEN.
BAKE PAN.
(Application filed Mar. 6, 1900.)

(No Model.) 2 Sheets—Sheet 2.

Witnesses George R. McMullen, Inventor.
By his Attorneys,

UNITED STATES PATENT OFFICE.

GEORGE R. McMULLEN, OF NEWARK, OHIO, ASSIGNOR OF ONE-HALF TO WILLIAM McMULLEN, OF SAME PLACE.

BAKE-PAN.

SPECIFICATION forming part of Letters Patent No. 663,921, dated December 18, 1900.

Application filed March 6, 1900. Serial No. 7,540. (No model.)

*To all whom it may concern:*

Be it known that I, GEORGE R. MCMULLEN, a citizen of the United States, residing at Newark, in the county of Licking and State of Ohio, have invented a new and useful Bake-Pan, of which the following is a specification.

This invention relates to a combined baking and roasting pan having attachments for converting it from one form to another to accommodate various uses; and the object of the same is to provide a combination device of this character capable of various arrangements to adapt it for roasting meats, vegetables, baking bread, puddings, cakes, potatoes, toasting bread, and all articles of food so prepared, the several parts being easily handled and adjusted so as to adapt them for quick change and different services.

The invention consists in the construction and arrangement of parts hereinafter more fully described and claimed.

Figure 1:
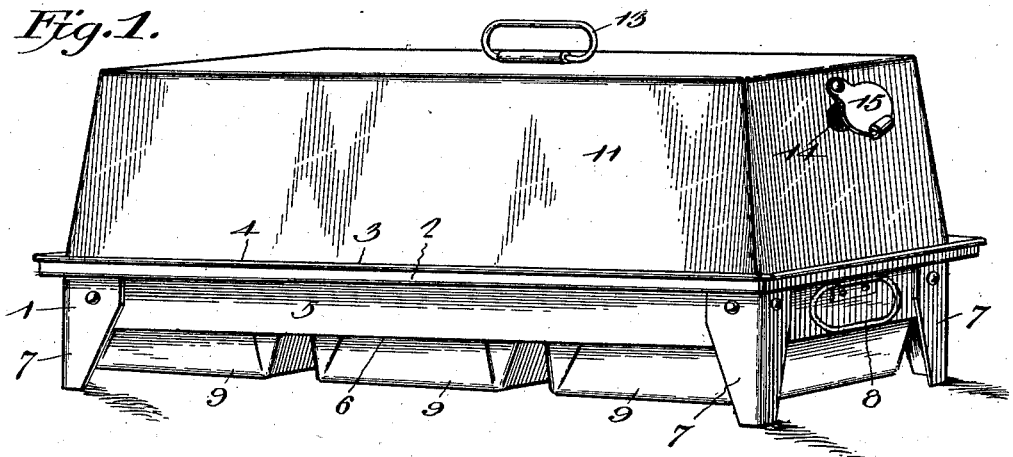
Figure 2:
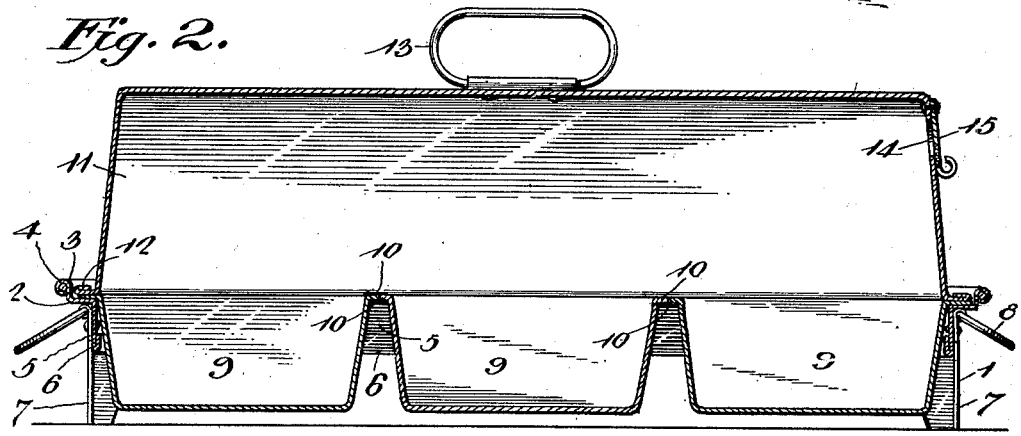
Figure 3:
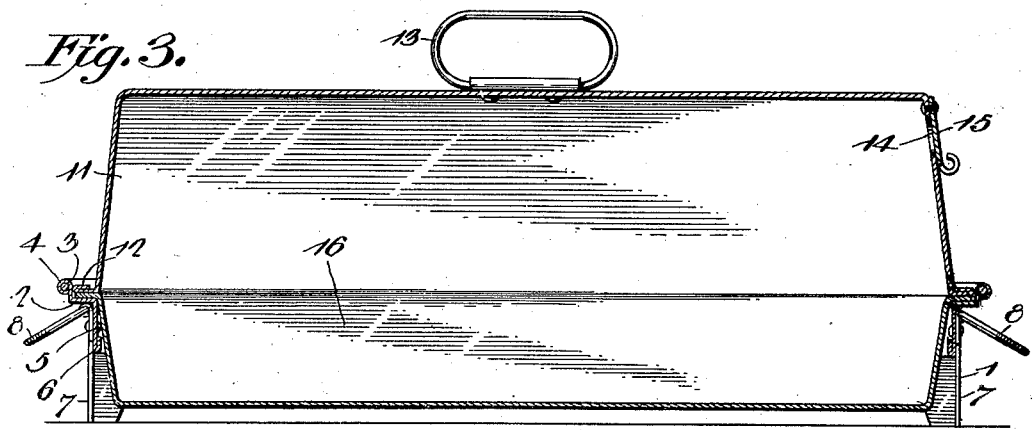
Figure 4:
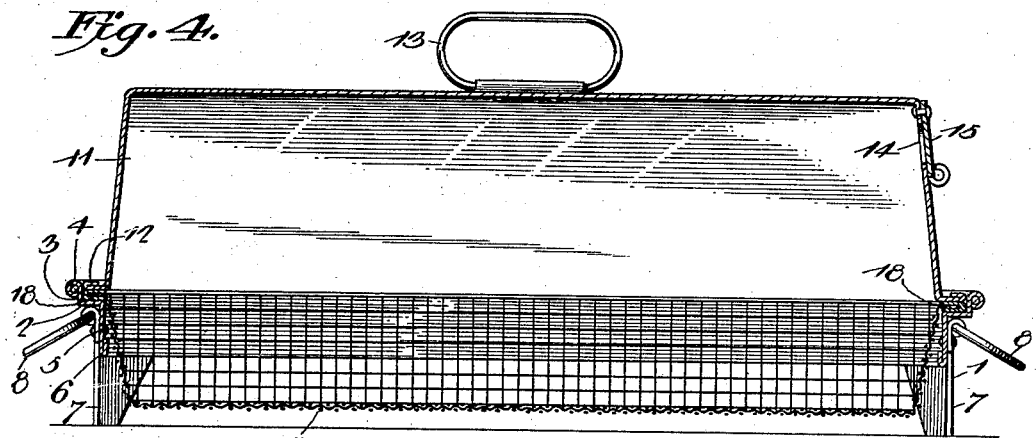
Figure 5:
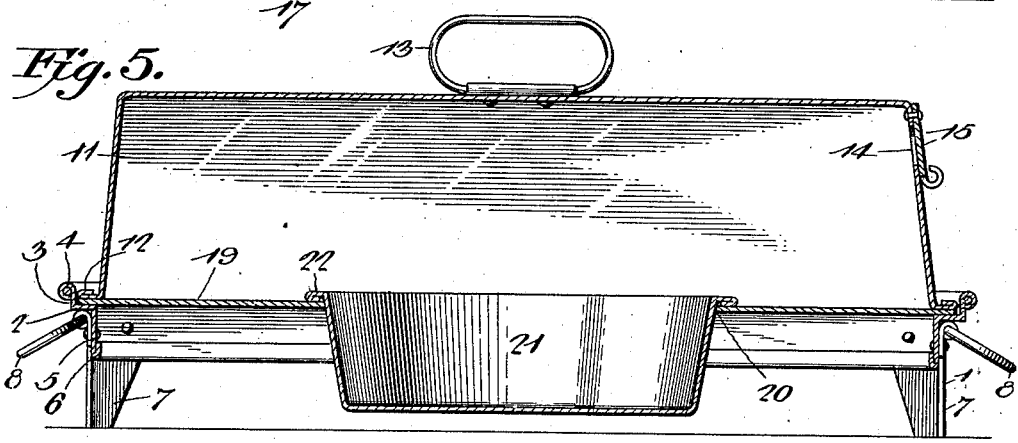
Figure 6:
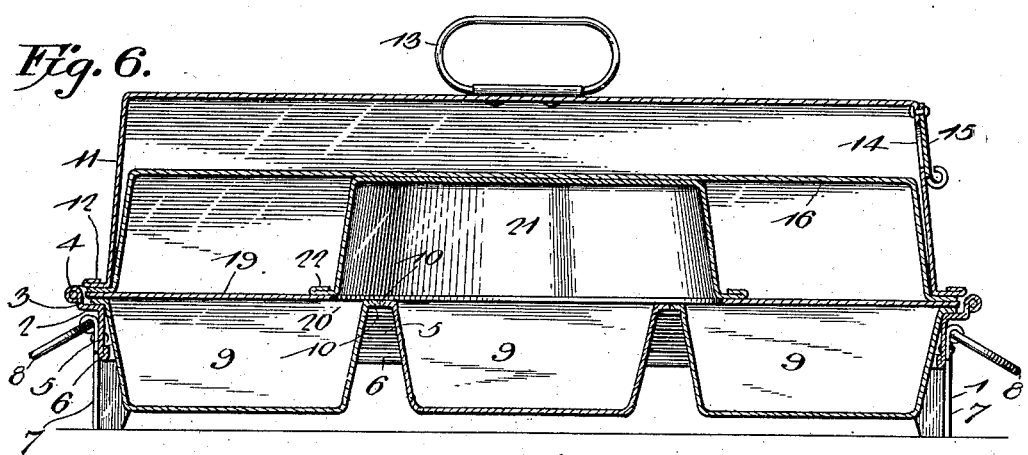

In the drawings, Figure 1 is a perspective view of the improved pan shown arranged for baking bread or other like articles of food. Fig. 2 is a longitudinal vertical section of the arrangement of parts shown by Fig. 1. Fig. 3 is a view similar to Fig. 2, showing the pan arranged for roasting meats or like articles. Fig. 4 is a longitudinal vertical section of the improved pan, showing a wire tray or basket therein for use in toasting bread or other purposes where an open structure is desired. Fig. 5 is a longitudinal vertical section of the improved pan shown arranged for baking puddings and the like. Fig. 6 is a longitudinal vertical section of the improved device, showing a compact arrangement of the several parts.

Similar numerals of reference are employed to indicate corresponding parts in the several views.

The numeral 1 designates a frame which is of rectangular form and preferably constructed of sheet iron or tin. This frame has an upper offset or horizontal flange 2 with an upstanding outer extremity 3, continuing into a wired or beaded edge 4, thus producing a substantially L-shaped rim, from which depends a surrounding body-flange 5, having a lower upturned closely-bent edge 6, and at the corners or angles of the said body-flange feet or supports 7 are firmly secured, the said feet or supports being slightly turned outwardly, so that the frame will move easily on the oven-floor, and, furthermore, the feet are of such length that the height of the entire frame will be such as to hold the pans or other devices supported thereby elevated above the bottom or floor of an oven top surface of any other base-rest upon which the improved pan may be disposed.

The upstanding extremity 3 of the horizontal flange 2 is deep enough to accommodate several thicknesses of material or parts of attachments that may be supported thereby without causing or allowing a sliding or disconnecting movement of the same, and thereby always maintain the several attachments in their desired position. For convenience in elevating the frame 1 and the parts supported thereby it is provided with opposite handles 8, which may be of any preferred form, though those shown are preferred in view of their simplicity and cheapness.

The frame 1 is used at all times and with all the attachments, and, as shown by Figs. 1 and 2, the improved device has attachments assembled in connection therewith for baking bread or analogous purposes and comprises a series of pans 9, which have surrounding side and end flanges 10 projecting outwardly therefrom in horizontal planes and rested at the ends on the flange 2 at the opposite end and adjacent side portions of the frame and intermediately upon each other, as clearly shown in Fig. 2. In arranging the pans 9 in the frame 1 the two end pans are first disposed upon the flange 2 and the intermediate pan 9 afterward placed in position and with its flanges 10 edge to edge with the similar flanges of the adjacent pans, so that these parts may be conveniently assembled and disassociated and the said intermediate pans strongly supported. When the pans 9 are assembled as set forth, their bottoms are elevated a suitable distance above the floor of the oven or other support, and in view of the usual flare of the sides and ends of the pan a thorough circulation of the heated air or the desirable effect of the heat of the oven around the sides and ends of the said pans is freely permitted to facilitate the baking process. Instead of using the pans 9 for baking bread they may also be employed for other analogous purposes, and the number used will depend upon the size of the frame.

Another feature common to all the arrangements and forming one of the attachments is a lid or cover 11 of a particular construction and having a bottom outwardly-projecting horizontal flange 12, an upper central handle 13, and an end vent-opening 14, controlled by a pivoted slide-plate or damper 15, which bears close enough against the end of the said lid or cover adjacent the opening 14 with such degree of friction as to retain its adjusted position when partially or entirely opened. The lid or cover 11 has considerable depth to form a chamber to serve effectively in baking the top portions of the bread loaves or other articles in the pans 9, and by means of the vent-opening 14 a thorough circulation can be set up and also permit escape of moisture or other vapors. The lid or cover 11 has its flange 12 also held in the rim of the frame and rested upon the flanges of the pans 9 and is adapted to be quickly applied and easily removed and by its use insures a regular even baking operation and prevents burning of the top crusts of the articles contained within the pans below.

In Fig. 3 the frame 1 and lid or cover 11 are shown in use with a drip-pan 16 for roasting meats and the like, and it will be observed in this instance also that the bottom of the drip-pan is elevated above the floor of the oven or the lower extremities of the legs 7. This form of the improved device is particularly useful and beneficial for its intended service in view of the fact that the juices of the meats or fowls contained within the drip-pan will be prevented from passing off into the oven and lost, and burning and scorching will also be obviated by the use of the lid or cover 11, and particularly in view of the fact that the bottom of the pan is held above the oven-bed for a free circulation of air thereunder. In Fig. 4 the same arrangement or combination of the frame 1 and lid or cover 11 is illustrated in use with a wire tray or basket 17, which can be conveniently employed for toasting breads, roasting potatoes, or other like articles capable of being cooked in an open receptacle. The rim 18 of the basket or tray 17 is disposed on the horizontal flange 2 of the frame 1, and the lower flange of the lid or cover 11 is rested thereover, and in this instance also the bottom of the basket or tray is elevated above the lower extremities of the feet 7. By removing the lid or cover 11 from the basket or tray 17 the latter can be also conveniently used for draining and drying dishes.

In Fig. 5 a further variation in the arrangement of parts is shown, and in this instance the frame 1 and the lid or cover 11 are also employed, together with a sheet-metal plate 19, which corresponds in size to the flange 2 of the frame and is removably rested on the said flange when in use with the bottom flange of the said lid or cover disposed thereon. The plate 19 has an opening 20 in the center thereof in which is removably mounted a pudding dish or pan 21, having a horizontal flange 22 at its upper portion to rest on the plate 19 around the opening 20. This pan 21 may be used for other purposes, as will be obvious, and the bottom thereof is elevated above the lower extremities of the legs 7 for a purpose which has been previously explained in connection with the other combination of devices.

In Fig. 6 the parts are shown conveniently assembled for storage when not in use, and though the wire basket or tray 17 is absent in this figure it will be understood that it can be primarily formed in such shape as to fit over the drip-pan, for instance, and thus maintain all the attachments in close relation.

While the sheet-metal plate 19 (shown in Fig. 5) only has one opening 20 therein, it will be understood that a number of these openings of smaller dimensions could be employed for supporting as many smaller pans, crocks, or other similar containing-receptacles.

The advantages of the improved combination are manifold, in addition to the general convenience and capabilities arising from the separable arrangements of the parts and their substitution to have the combined device serve in the several forms shown and described. By having the pans free from the bottom of the oven-floor a free circulation of heated air on all parts of the pans is had, as before indicated, thus insuring a thorough and even baking without burning and obviating the necessity of exercising that care and watchfulness as in the ordinary baking methods. It has been found by actual test and experience that bread baked in the improved device is more evenly and thoroughly cooked by the steam which will exist to a more or less degree within the chamber formed by the lid or cover 11 and which may be more positively affected by closing the vent-opening in said lid or cover, and thereby keep the bread moist. The same advantages are found in roasting meats and in other articles, and particularly in basting the articles roasted through the utilization of the lid or cover, which confines the steam and holds the water of condensation so that it will fall back on the material being roasted. It is also possible to have the frame adjustable or telescopic at the sides and ends, which would be an obvious expedient and in like manner regulate the height through the legs or supports. Moreover, changes in the form, proportions, size, and minor details of construction may be resorted to without departing from the principle or sacrificing any of the disclosed salient features of the invention.

Having thus described the invention, what is claimed is—

1. In a device of the character set forth, the combination of a completely-open rectangular frame with corner legs and an upper horizontal rim with an outer upstanding portion, the sides and ends being also open between the legs to permit an unretarded circulation of heated air therethrough, and the said rim adapted to removably receive a plurality of different cooking utensils including a receptacle, a horizontal extension from said receptacle being supported by the horizontal rim of the frame, the said receptacle depending through the interior of the frame and having its bottom above the plane of the base-rest of the frame, and a chambered lid or cover removably mounted on and entirely independent of the said frame and having a lower horizontal flange to engage the horizontal rim of said frame.

2. A nest of cooking utensils comprising a completely-open frame with legs and an upper horizontal rim, a plate to removably bear on the latter and having a central opening to receive a flanged receptacle, a single flanged receptacle of substantially the same dimensions as the frame and also provided with a flange to removably bear on the said rim, a plurality of smaller receptacles having upper horizontal flanges to removably fit on the frame-rim, all the receptacles being suspended by the frame so that the bottoms will be clear of the base-rest of the latter, and a single chambered lid common to all the devices and having a lower horizontal flange to loosely and removably rest on the frame-rim and the portions of the devices engaging said rim.

3. A device of the character set forth, comprising a completely-open rectangular frame with corner legs and an upper horizontal rim with an outer upstanding portion, a plurality of pans having upper flanges loosely and removably resting on the said rim and suspended in a transverse direction in the frame, the bottoms of the pans being above the plane of the base-rest for the frame, and a chambered lid or cover removably mounted on and entirely independent of the said frame and having a lower horizontal flange to loosely engage the rim of the frame.

In testimony that I claim the foregoing as my own I have hereto affixed my signature in the presence of two witnesses.

GEORGE R. McMULLEN.

Witnesses:
   IRWIN I. HANNA,
   EVA L. GAY.